June 2, 1925.
B. M. LEECE
VOLTAGE REGULATION FOR GENERATORS
Filed Dec. 10, 1923
1,540,698
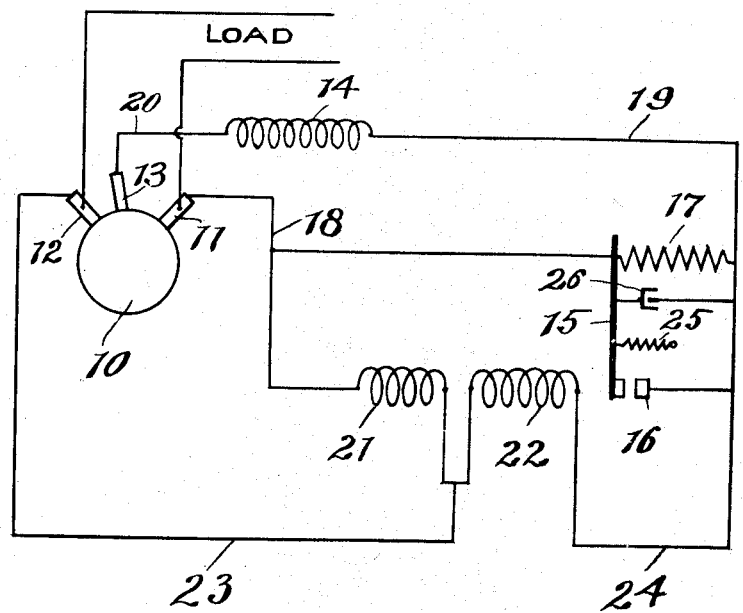
Inventor
Bennett M. Leece
By Thurston Knox & Hudson
Attorneys Patented June 2, 1925.

1,540,698

UNITED STATES PATENT OFFICE.

BENNETT M. LEECE, OF CLEVELAND, OHIO, ASSIGNOR TO THE LEECE-NEVILLE COMPANY, OF CLEVELAND, OHIO, A CORPORATION OF OHIO.

VOLTAGE REGULATION FOR GENERATORS.

Application filed December 10, 1923. Serial No. 679,575.

*To all whom it may concern:*

Be it known that I, BENNETT M. LEECE, a citizen of the United States, residing at Cleveland, in the county of Cuyahoga and State of Ohio, have invented a certain new and useful Improvement in Voltage Regulation for Generators, of which the following is a full, clear, and exact description.

This invention relates to voltage regulators for dynamo electric machines and is especially adapted for lighting generators of motor vehicles wherein the speed and load vary very materially.

The chief object of the present invention is to provide a regulator which has the desired sensitiveness, maintaining the generator voltage at the desired value, or within the desired range of variation as the speed and load vary between maximum and minimum conditions, and which at the same time does not require delicate adjustments, and is more rugged than voltage regulators heretofore utilized, and is especially adaptable for severe service conditions for which the other regulators are unsuited, as, for example, in connection with lighting generators on motor driven busses.

The above and other objects are accomplished by my invention which may be here briefly summarized as consisting in certain novel details of construction, and combinations and arrangements of parts which will be described in the specification and pointed out in the appended claims.

The single figure of the drawing illustrates diagrammatically one embodiment of the invention.

My invention has proven to be particularly useful in connection with generators of the third brush type, and for that reason I have illustrated the invention applied to a third brush generator, that illustrated having an armature 10, main brushes 11 and 12, and an auxiliary or third brush 13 which is adjustable between the main brushes and a field winding 14 connected between the main brush 11 and auxiliary brush 13.

The regulator is provided with a vibrating blade 15 adapted to move into and out of engagement at a high rate with a stationary contact 16, the contacts serving to alternately increase and decrease the resistance of the field circuit, and in this instance to cut a resistance 17 into and out of the field circuit by alternately opening and closing a short circuiting path around it.

Let it be assumed that the main brush 11 is a positive brush, and the main brush 12 is a negative brush, then the field circuit is from positive brush 11 by conductor 18 through the resistance when the contacts are open, or across the contacts around the resistance when the contacts are closed, and by way a conductor 19 through the field winding 14, and by a conductor 20 to the auxiliary brush 13.

In carrying out my invention I utilize two vibrator coils 21 and 22, one of these coils, in this instance, the coil 21, being connected across the main terminals of the generator so as to be responsive to changes in voltage of the machine, this coil having a circuit which is constantly closed, or is unaffected by the action of the regulator. In this instance, one terminal of the coil 21 is connected to the conductor 18 leading to the positive brush 11, and the other terminal is connected by conductor 23 to the negative brush 12.

The other coil 22 is connected differently to the terminals of the generator, and its circuit is opened and closed, or at least varied by the vibration of the contacts.

The effect of the two coils are additive in the core of the vibrator, the coil 22 having for its chief function to cause the movable contact member to vibrate, while the chief function of the coil 21 is to respond to voltage changes in the generator to increase or decrease the rate of vibration.

In the application of my invention herein illustrated, it will be observed that when the contacts are closed, the coil 22 is connected across the main terminals of the generator, the circuit then being from positive brush 11 by conductor 18 to the contacts, by conductor 24, which connects one terminal of the coil and the stationary contact 16, and by way of conductor 23 to which the other terminal of the coil is connected to the negative brush 12. Likewise it will be observed that when the contacts are open, the coil 22 is in a circuit subject to the potential drop between brushes 11 and 13, i. e. the circuit containing the field winding, but this difference of potential has a tendency to reverse the current flow in coil 22 over the direction of flow when the contacts are closed, the effect of which is to quickly de-energize this coil following the opening of the contacts. Whether or not current will flow through the coil 22 in the reverse direction will depend primarily upon the relative resistance of the coils 21 and 22, on the one hand, and the resistance 17 on the other and possibly on changes in the relative polarity of the brushes 12 and 13 under varying conditions of load and speed, but in any event, on the opening of the contacts 16 there is a difference of potential or a force tending to reverse the current flow, and therefore to de-energize the coil as soon as the contacts are opened. As this regulator is at present employed by me with very good results, the ohmic value of resistance 17 is less than that of coil 22, but the resistances of these parts may be differently proportioned, and in some instances the resistance 17 may be omitted entirely, in which event the coil 22 will serve its purpose, for as explained above, when the contacts are open, this coil is in the field circuit across the contacts.

It will be seen, therefore, that my improved regulator comprises two coils which have a combined effect upon the vibrator blade to open and close the circuit which varies the field resistance, and that one of these coils is constantly energized and subjected to the voltage of the machine, the magnetization of the regulator core due to this coil, varying as the machine voltage varies, and that the other coil which relieves the coil 21 of the function of causing the vibrating member to vibrate has its circuit opened and closed at a rate which is varied by the action of coil 21. Further, it will be observed that by reason of the fact that when the contacts are open, the voltage between one of the main and the auxiliary brush is impressed upon the coil 22 tending to produce reversal of current therein. The action of the vibrator is positive and rapid, and the sluggish action which is undesirable in a regulator is avoided without requiring delicate adjustments so frequently necessary. For example, I am enabled to employ a much stiffer spring, indicated in the drawing at 25, than is generally possible in regulators such as are employed on motor vehicles, and this has the advantage that the regulator is not affected by vibration of the vehicle, in consequence of which the device is well adapted for use on vehicles traveling over rough roads or at high rates of speed. Furthermore, with my improved regulator there is almost complete absence of sparking at the contacts. In fact, the use of a condenser across the contacts is unnecessary though a condenser is preferably employed, and one is shown on the drawings at 26. Furthermore, the vibrator blade vibrates at such a high speed that when the lamp load is thrown on the light is steady and there is absence of flickering and so-called hunting.

While I have shown one embodiment of my invention, I do not desire to be confined to the precise details or arrangements shown, either as to the regulator itself or to the type of generator to which the regulator is applied, and I aim, therefore, to cover all modifications which do not involve a departure from the spirit and scope of the invention as defined in the appended claims.

Having described my invention, I claim:

1. In combination with a variable speed, variable load generator having a field circuit, a regulator for varying the field excitation comprising two relatively movable contacts and two coils, one of the latter being connected to the generator independently of the contacts, and the other being connected to the generator through the contacts when the latter are closed, and said second mentioned coil having another connection with the generator independently of the contacts.

2. In combination with a variable speed, variable load generator having a field circuit, a regulator for varying the field excitation comprising a resistance adapted to be cut into and out of the field circuit, a pair of contacts for short circuiting the resistance, and two coils one connected to the generator independently of the contacts, and the other being connected to the generator through the contacts when the latter are closed, and having another connection with the generator in parallel relation with said resistance and independently of the contacts.

3. In combination with a variable speed, variable load generator having brushes and a field circuit, a regulator for varying the field excitation comprising a vibrating member and two contacts, and a coil connected to the contacts and having two connections with the generator so as to be subjected to the voltage of the generator when the contacts are closed and to a voltage from the generator tending to reverse the current flow therethrough when the contacts are opened.

4. In combination with a variable speed, variable load generator having brushes and a field winding with its terminals connected to the brushes, a regulator comprising a vibrating member and contacts for varying the field excitation, and two coils, one connected to the generator so as to be responsive to voltage changes, and having its circuit connections unaffected by the contacts, and the other having its circuit varied by the opening and closing of the contacts whereby when the contacts are closed the coil is subjected to a voltage causing the passage of current therethrough in one direction but when the contacts are opened the coil is subject to a voltage tending to produce current flow in a reverse direction.

5. In combination with a generator of the third brush type having main brushes and an auxiliary brush, a field winding connected between a main brush and the auxiliary brush, a regulator for varying the field excitation comprising a vibrating member and contacts, and two coils, one coil being connected between the main brushes, and the other being connected to the brushes so as to be subject to the difference of potential between one pair of the same when the contacts are closed and so as to be subject to the difference of potential between another pair when the contacts are open.

6. In combination with a generator of the third brush type having main brushes and an intermediate auxiliary brush, a field winding connected between one of the main and the auxiliary brush, a regulator for varying the field excitation comprising a vibrating member and contacts, and two coils, one coil being in a circuit connected to the main brushes, and the other coil having a connection across the contacts with the main brushes, and having a connection around the contacts between one of the main and the auxiliary brush when the contacts are open.

7. In combination with a generator of the third brush type having main brushes and an intermediate auxiliary brush, a field winding connected between one of the main and the auxiliary brush, a regulator for varying the field excitation comprising a vibrating member and contacts, and two coils, one coil being in a circuit connected to the main brushes, and the other coil having a connection across the contacts with the main brushes, and having a connection around the contacts through the field winding when the contacts are open.

8. In combination with a variable speed, variable load generator of the third brush type having an armature, two main brushes and an auxiliary brush, and a field winding connected to one of the main brushes and to the auxiliary brush, a regulator comprising a vibratory element with contacts, and two coils, one connected to the armature independently of the contacts so that its circuit is unaffected thereby, and means connecting the other regulator coil to the armature to operatively associate said coil and the field winding with the contacts so that the magnetizing effects of the coil and winding will be altered on the opening and closing of the contacts, and said coil being connected to a different pair of brushes than the field winding.

9. In combination with a variable speed, variable load generator having an armature, two main brushes and an intermediate third brush, and a field winding, the latter being connected to one of the main brushes and to the auxiliary brush, a voltage regulator comprising a vibratory element with associated contacts, and two coils, both being connected to the main brushes, one independently of the contacts, and means connecting the other coil and field winding to the contacts so that the magnetizing effects thereof are varied by the operation of the contacts.

10. In combination with a variable speed, variable load generator of the third brush type having an armature, two main brushes and an auxiliary brush, and a field winding connected to one of the main brushes and to the auxiliary brush, a regulator comprising a vibratory element with contacts, and two coils, one connected to the armature independently of the contacts so that its circuit is unaltered by the action of the regulator, and means connecting the other regulator coil to the armature independently of the field winding, said coil and the field winding being operatively associated with the contacts so that the magnetizing effects of the coil and winding will be altered on the opening and closing of the contacts.

In testimony whereof, I hereunto affix my signature.

BENNETT M. LEECE.